United States Patent
Lewis et al.

(10) Patent No.: US 9,032,310 B2
(45) Date of Patent: May 12, 2015

(54) NETWORKED DESKTOP USER INTERFACE

(75) Inventors: Alan Lewis, Santa Clara, CA (US);
Lance Christmann, Albany, OR (US);
Sean Christmann, Aurora, CO (US)

(73) Assignee: eBay Inc., San Jose, CA (US)

( * ) Notice: Subject to any disclaimer, the term of this patent is extended or adjusted under 35 U.S.C. 154(b) by 1175 days.

(21) Appl. No.: 11/917,668

(22) PCT Filed: Oct. 19, 2007

(86) PCT No.: PCT/US2007/022347
§ 371 (c)(1),
(2), (4) Date: Dec. 14, 2007

(87) PCT Pub. No.: WO2008/051480
PCT Pub. Date: May 2, 2008

(65) Prior Publication Data
US 2009/0313557 A1    Dec. 17, 2009

Related U.S. Application Data (60) Provisional application No. 60/862,378, filed on Oct. 20, 2006, provisional application No. 60/942,942, filed on Jun. 8, 2007.

(51) Int. Cl.
*G06F 3/00* (2006.01)
*G06Q 30/02* (2012.01)
*H04L 29/08* (2006.01)

(52) U.S. Cl.
CPC .............. *G06Q 30/02* (2013.01); *H04L 67/02* (2013.01)

(58) Field of Classification Search
USPC ............... 705/14.4, 14.49, 14.51, 26, 27; 707/705, 706, 707, 708, 713, 722, 723, 707/727, 728, 737; 715/761, 962
See application file for complete search history.

(56) References Cited

U.S. PATENT DOCUMENTS

| | | | |
|---|---|---|---|
| 6,772,150 B1 * | 8/2004 | Whitman et al. | 707/721 |
| 7,664,680 B2 * | 2/2010 | Pitkow | 705/26 |
| 7,783,632 B2 * | 8/2010 | Richardson et al. | 707/727 |
| 2003/0093326 A1 * | 5/2003 | Poon et al. | 705/26 |
| 2004/0078214 A1 * | 4/2004 | Speiser et al. | 705/1 |
| 2004/0243570 A1 | 12/2004 | Gross | |
| 2005/0091140 A1 * | 4/2005 | Sloan et al. | 705/37 |
| 2005/0097566 A1 | 5/2005 | Watts, Jr. et al. | |

(Continued)

FOREIGN PATENT DOCUMENTS

| WO | WO-2008051480 A2 | 5/2008 |
|---|---|---|
| WO | WO-2008051480 A3 | 5/2008 |

OTHER PUBLICATIONS

"International Application Serial No. PCT/US2007/022347, International Preliminary Examination Report mailed Apr. 30, 2009", 9 pgs.

(Continued)

*Primary Examiner* — Rashawn Tillery
(74) *Attorney, Agent, or Firm* — Schwegman Lundberg & Woessner, P.A.

(57) ABSTRACT

This document discusses, among other things a server interface to bridge communications between a desktop application and a web server. In an example embodiment, the server interface translates a communication from the desktop application (e.g., in a desktop programming language) to HyperText Markup Language (HTML) and transfers the translated communication over a network to a web server.

21 Claims, 9 Drawing Sheets

(56) References Cited

U.S. PATENT DOCUMENTS

| | | |
|---|---|---|
| 2005/0125240 A9 * | 6/2005 | Speiser et al. .................... 705/1 |
| 2005/0240558 A1 | 10/2005 | Gil et al. |
| 2006/0036746 A1 | 2/2006 | Davis |
| 2006/0179415 A1 | 8/2006 | Cadiz et al. |
| 2006/0218077 A1 | 9/2006 | Walker et al. |
| 2007/0203820 A1 * | 8/2007 | Rashid ........................... 705/37 |

OTHER PUBLICATIONS

"International Application Serial No. PCT/US2007/022347, Search Report mailed Jun. 5, 2008.", 5 pgs.

"International Application Serial No. PCT/US2007/022347, Written Opinion mailed Jun. 5, 2008", 6 pgs.

* cited by examiner

NETWORKED DESKTOP USER INTERFACE

RELATED APPLICATIONS

This application is a U.S. National Stage Filing under 35 U.S.C. 371 from International Patent Application Serial No. PCT/US2007/022347, filed Oct. 19, 2007, which claims the priority benefit of U.S. Provisional Patent Application No. 60/862,378, filed Oct. 20, 2006 and entitled "DESKTOP USER INTERFACE WITH DRAG AND DROP FUNCTIONALITY AND USER-SPECIFIC CHARACTERISTICS", and to U.S. Provisional Patent Application No. 60/942,942, filed Jun. 8, 2007 and entitled "A NETWORKED DESKTOP USER INTERFACE TO ACCESS LOCALLY STORED DATA", which applications are incorporated herein by reference.

TECHNICAL FIELD

This patent document pertains generally to desktop application software, and more particularly, but not by way of limitation, to networked desktop user interfaces.

BACKGROUND

Software applications may be run on a computer. Typical software applications provide specific functions and provide an interface to enable a user to interact with the application.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

An example embodiment includes a server interface to bridge communications between a desktop application and a web server. In an example embodiment, the server interface translates a communication from the desktop application (e.g., in a desktop programming language) to HyperText Markup Language (HTML) and transfers the translated communication over a network to a web server.

Some example embodiments include a complementary application that monitors a network publication system for events (e.g., bids, new publications, etc.) associated with the desktop application. Upon detection of such an event, the complementary application provides a function (e.g., typically performed by the desktop application), on behalf of the desktop application. An example complementary application may in connection with providing the function initiate a communication with a web server.

Yet further example embodiments may include storing desktop data associated with a network publication system local to a desktop application. The desktop data may be accessed and analyzed using processing power of a local computer. In some embodiments, the desktop application may use the result of the analysis to provide a user with various tools or functionality.

This overview is intended to provide an overview of the subject matter of the present patent application. It is not intended to provide an exclusive or exhaustive explanation of what is claimed. The detailed description is included to provide further information about the subject matter of the present patent application.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the disclosure. The embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B." "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
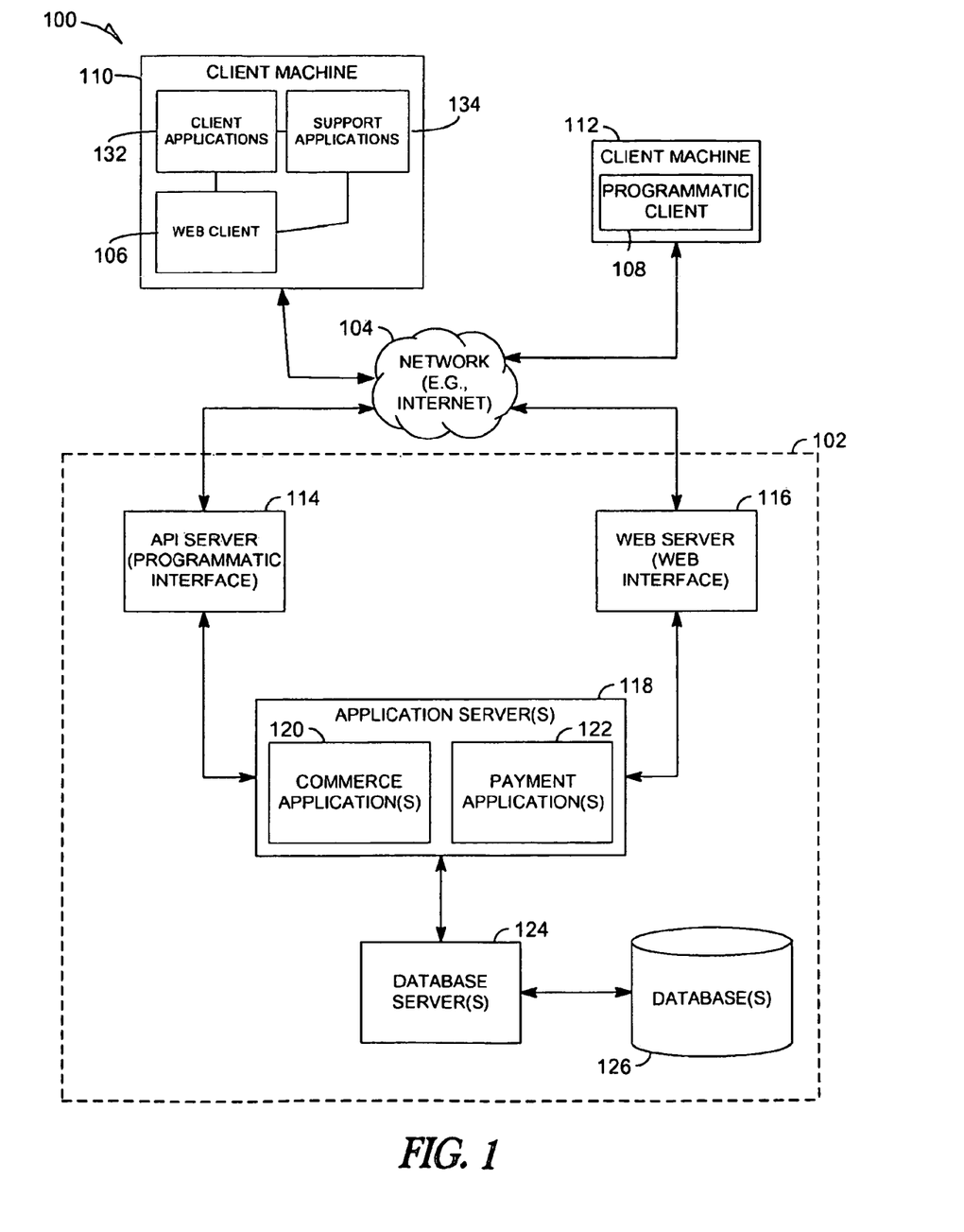
FIG. 1 is a network diagram depicting a client-server system within which an example embodiment may be deployed.

FIG. 1 is a network diagram depicting a client-server system 100, within which an example embodiment may be deployed. A networked system 102, may form a network-based marketplace or electronic publication system and may provide server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112. The client machine 110 may also include client applications 132 and support applications 134 (each discussed below).

An Application Program Interface (API) server 114 and a web server 116 are coupled to, and provide programmatic and web interfaces respectively to, one or more application servers 118. The application server(s) 118 host one or more marketplace applications 120 and payment applications 122. The application server(s) 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs client-server architecture, the present disclosure is of course not limited to such an architecture, and could equally well find application in a distributed, or peer-to-peer, architecture system, for example. The various marketplace application(s) 120 and payment application(s) 122 could also be implemented as standalone software programs, which do not necessarily have networking capabilities.

Figure 2:
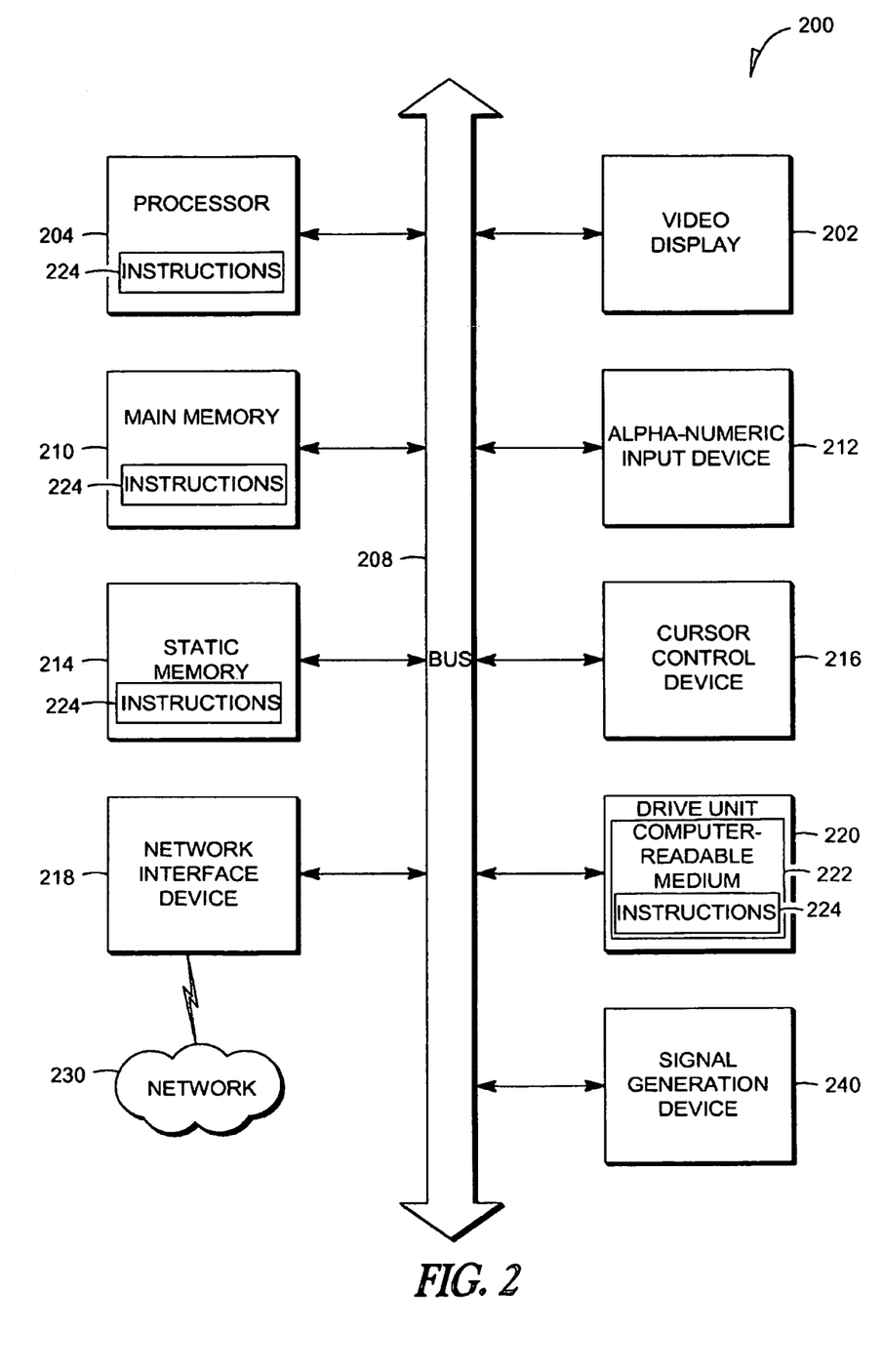
FIG. 2 shows a diagrammatic representation of machine in the form of a computer system, in accordance with an example embodiment.

The support applications 134 may further include a complementary application, alert module and a server interface (discussed in more detail with respect to FIG. 2). The web client 106 may access the various marketplace application(s) 120 and payment application(s) 122 via the web interface supported by the web server 116. Alternatively or additionally, the client applications 132 deploy a desktop user interface to access the various market applications 120 and payment applications 122 via the support applications 134 which in turn access the web interface (not shown) supported by the web server 116. In example embodiments, the support applications 134 may be used by the client applications 132 to interface with the web server 116 and the applications server 118, etc.

Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 138, executing on a third party server machine 136, as having programmatic access to the networked system 102 via the programmatic interface provided by the API server 114. For example, the third party application 138 may, using information retrieved from the networked system 102, support one or more features or functions on a website hosted by the third party. The third party website may, for example, provide one or more promotional, marketplace or payment functions that are supported by the relevant applications of the networked system 102.

FIG. 2 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 204 (e.g., a central processing unit (CPU) a graphics processing unit (GPU) or both), a main memory 210 and a static memory 214, which communicate with each other via a bus 208. The computer system 200 may further include a video display unit 202 (e.g., a liquid crystal display (LCD) or a cathode ray tube (CRT)). The computer system 200 also includes an alphanumeric input device 212 (e.g., a keyboard), a cursor control device 216 (e.g., a mouse), a disk drive unit 220, a signal generation device 240 (e.g., a speaker) and a network interface device 218.

The disk drive unit 220 includes a machine-readable medium 222 on which is stored one or more sets of instructions (e.g., software 224) embodying any one or more of the methodologies or functions described herein. The software 224 may also reside, completely or at least partially, within the main memory 210 and/or within the processor 204 during execution thereof by the computer system 200, the main memory 210 and the processor 204 also constituting machine-readable media.

The software 224 may further be transmitted or received over a network 230 via the network interface device 218.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Figure 3:
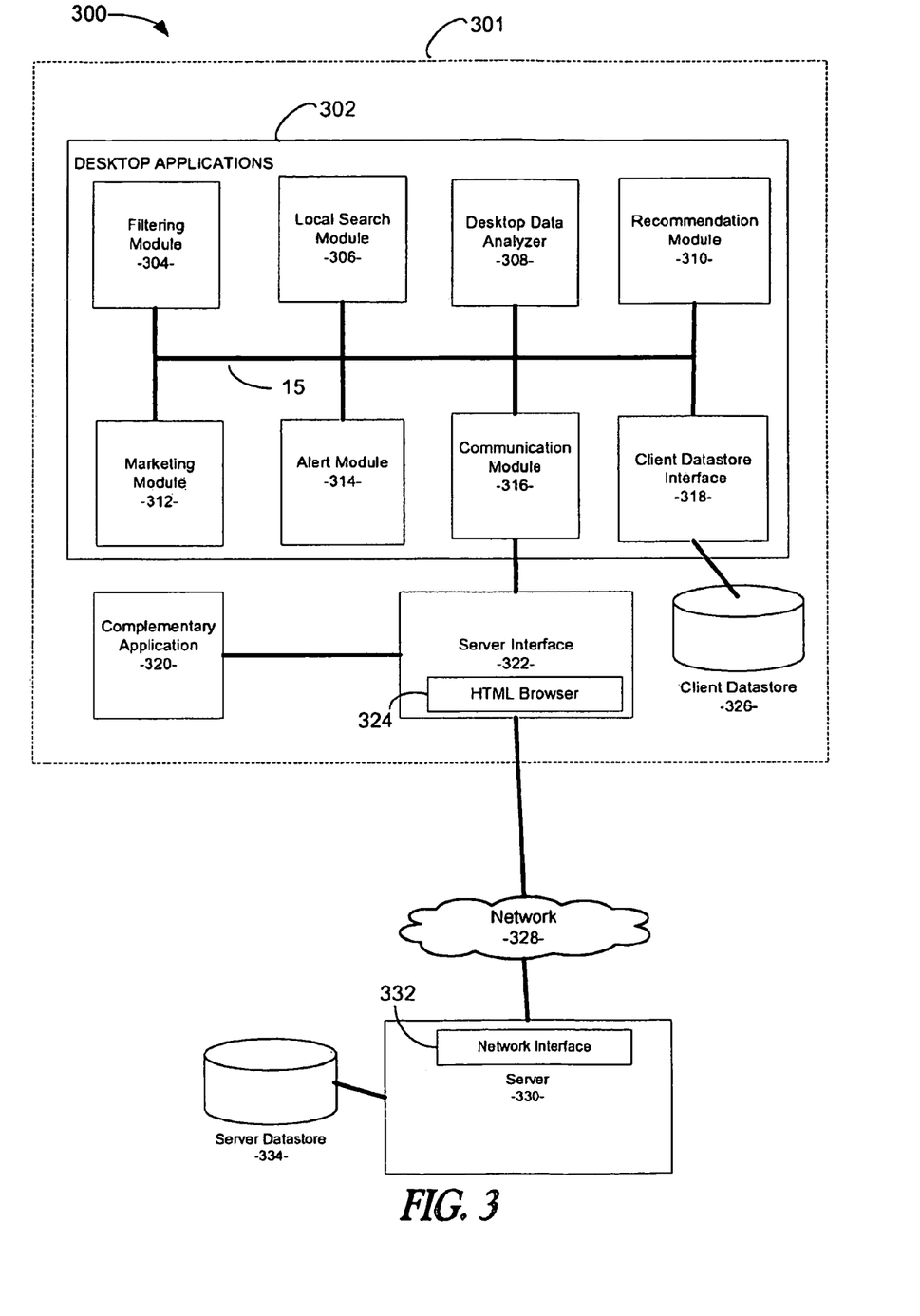
FIG. 3 is a network diagram depicting another example client-server system within which an example embodiment may be deployed.

FIG. 3 is a network diagram depicting an example client-server system 300 forming an example network publication system within which an example embodiment may be deployed. The client machine 301 of the client-server system 300 is shown to include desktop applications 302, a complementary application 320, a server interface 322 and a client datastore 326.

The client datastore 326 may be used to store user, transaction, and system information locally, in support of the desktop user interface. Communications may be made between the desktop applications 302 and the client datastore 326 via the client datastore interface 318. In an example embodiment the desktop applications 302 may use the client datastore 326 for storing a complete history of every item the user has viewed, going back months, for example.

Information and data, as referred to herein, may include information associated with operation of the desktop applications 302. Data that the desktop applications 302 (and e.g., other local applications) access may also be stored within the client machine 110 and/or the client datastore 326.

As a result of the desktop applications 302 and/or their associated data being stored remotely from the server system 330, 331, less traffic to the server system 330, 331 may be required and fewer server system 330, 331 resources may be used by desktop applications 302 than network based storage.

As discussed in more detail below, the server interface 322 may bridge a communication gap between the client machine 301 and the server 330. In an example embodiment, the server interface 322 may include a HyperText Markup Language (HTML) browser to further interface with an HTML interface to the server 330. The communication module 316 may serve as a communication interface between the desktop application 302 and the server interface 322. The client machine 301 (e.g., the desktop applications 302, the complimentary applications 332 and/or other local applications, etc.) may communicate with the server 330 and the server datastore 334, via the network 328 and the server interface 322. Alternatively or additionally, the communication module 316 may interface directly with the network 328.

A complementary application 320 may complement the desktop applications 302. In various example embodiments, the complementary application 320 may be used in conjunction with or as a substitute for the desktop applications 302. The complementary applications 320 may exist as a relatively small program that communicates with the desktop applications 302 (e.g., a relatively large desktop application). The complementary application may in effect serve as a user interface and program that receives input from users of the client machine 301 and provides output to users on behalf of the desktop applications. The complimentary applications 320 may communicate with the server via the server interface 322.

The desktop applications 302 are shown to include several functional modules 304-318. It is to be appreciated that the modules 304-318 may be implemented with software instructions, hardware or a combination of the two. As described above, the client datastore interface 318 may enable communications between the client machine 301 and the client datastore 326.

The filtering module 304 may provide for the application of various filters to lists of information (e.g., item listing returned on a search) that refine the lists by including or excluding certain data. The local search module 306 may be used by a human or software user to locate information stored within the client machine 301, client datastore 326, the server datastore 334, the server 330 and/or any other data storage.

The alert module 314 may provide alerts to a user in response to a detection of certain events or conditions. In an example embodiment an alert may be triggered in response to an event (e.g., a bidder has been outbid) detected by the desktop applications 302 and/or the complementary application 320.

The alert can take the form of a real-time message displayed by the alert module 314 or the complementary application 320. Example alerts include an instant message, an email, and the like. The alert can prompt the user to take some action. A user may specify the conditions for providing the alert and the mode in which the user is alerted by configuring the alert module 314, the complementary application 320 or by configuring the desktop applications 302.

The recommendation module 310 may provide for various kinds of recommendations to a user or to application software. In an example embodiment, the recommendation module 310 provides search query recommendations to a human user based on the popularity of queries posed by the community of networked users.

The server 330 may include the ability to communicate certain information between the server 330 and the client machine 301 via a network interface 332 at periodic and/or sporadic times. Instead of having the desktop applications 302 continually refreshing a client browser by sending requests every second to a server, this architecture permits the desktop applications 302 to have a persistent connection to server 330. Over that persistent connection, an application server 118 within the server 330 may push events from the server 330 to the desktop applications 302. Additionally, the persistent connection can also be used for updating desktop applications 302 functionality.

Figure 4:
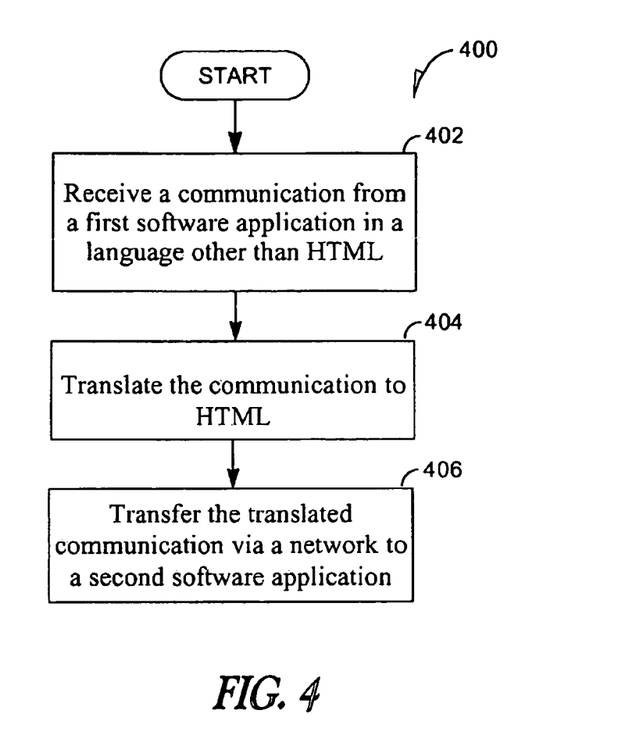
FIG. 4 is a flow diagram of a method for communicating with a network, in accordance with an example embodiment.

FIG. 4 is a flow diagram of a method 400 for communicating with a network 328, in accordance with an example embodiment. In an example embodiment, an API may not be used by the desktop applications 302 or the server 330 of FIG. 3 to bridge communications between them. At block 402, the method 400 begins with receiving a communication from a software application (e.g., a first software application), in a language (e.g., a software language) being other than HTML.

In an example embodiment the server interface 322 may be coupled between the client applications 302 (e.g., a first software application) and the server 330 (e.g., via the network interface 332). In an example embodiment, the server interface 322 may receive the communication from the desktop applications 302 in a desktop programming language such as C++, Java script, Adobe Integrated Runtime (AIR®), or any other programming language, etc.

At block 404, the method 400 includes translating the communication to HTML. The server interface 322 may generate HTML language (e.g., code) from a non-HTML language based on a script that makes calls from one programming language to another (e.g., from the desktop programming language to HTML). The server interface 322 may automatically copy the translated communication into one or more fields of the HTML browser 324. In this way the server interface 322 may provide an automated process that bridges a software communication gap.

The HTML browser 324 may not be designed to support direct interaction with a human user. For example, the HTML browser 322 may be not be visible to a human viewer or be designed to facilitate the entry of input or the display of output. The HTML browser 324 may be analogous to an invisible web browser. Software settings may configure the HTML browser 324 of the server interface 322 to be visible or invisible.

At block 406, the method 400 includes transferring the translated communication via a network (e.g., network 328) to a different (e.g., a second) software application (e.g., a network interface 332 operating on the server 330) using HTTP.

The server interface 322 may communicate the translated communication to the interface software 332 on the server 330 via the network 328. The server interface 322 may facilitate communication in the absence of an API.

In some example embodiments, the translated communication may include transactional information associated with a publication (e.g., submitting a bid for an item posted in an online item listing). Various example embodiments may include transferring the translated communication as authentication information to gain access to the server 330 (e.g., a web server).

For example, the example server interface 322 may be used to implement user name and password login. A user may enter username and password information through a text box (not shown) provided by the desktop applications 302. The authentication process may request the transfer of information between the desktop applications 302 and the server 300. In an example embodiment the server interface 322 receives commands, login information and/or other information, etc. from the desktop applications 302 via the communication module 316. The information arrives in a desktop language, is translated and then forwarded to the interface software 332 on the server 330 using HTML language, where it may be used to authenticate the user. Further example embodiments may include automation of a checkout process in a network publication system.

Figure 5:
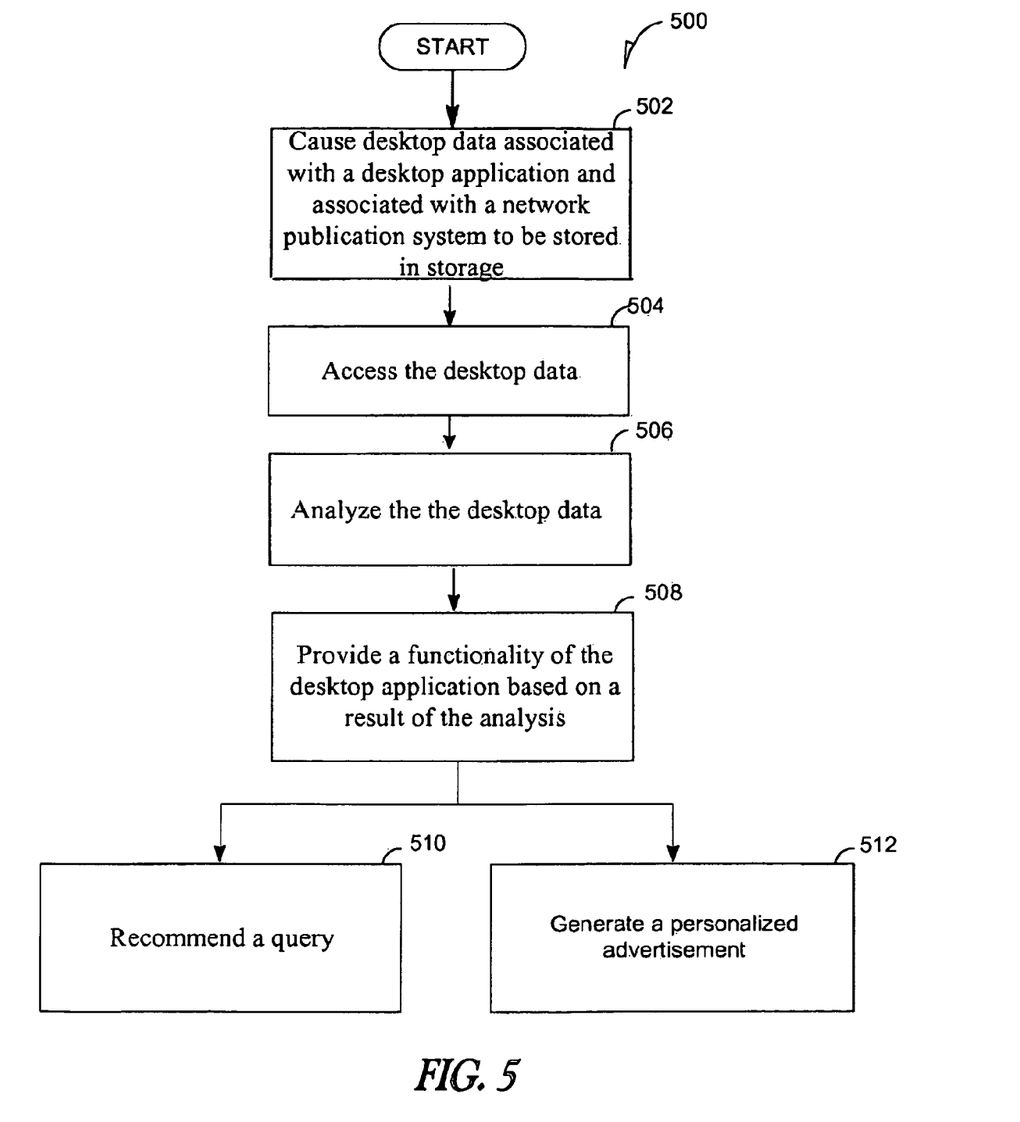
FIG. 5 is a flow diagram illustrating a method for analyzing desktop data, in accordance with an example embodiment.

FIG. 5 is a flow diagram illustrating a method 500 for analyzing desktop data in accordance with an example embodiment. The method 500 starts at block 502 with causing desktop data associated with a desktop application and associated with a network publication system to be stored in storage. In an example embodiment, the client machine 301 includes the desktop applications 302 and is coupled with the client datastore 326 to store the desktop data (e.g., local to the client machine 301).

In different example embodiments, various types of desktop data may be stored within the client datastore 330. In some example embodiments, desktop data is associated with account information (e.g., contact information, payment information, and/or any other account information, etc.) and is stored on the client datastore 326. Desktop data may include global (e.g., network wide) filter information, user rating information, query data, purchase data or inventory data associated with an item. Metadata associated with the inventory data may also be desktop data.

In an example embodiment, desktop data may be associated with an item that has been purchased via the desktop application 302. Inventory data may include information about items owned by a user. In an example embodiment, whether inventory data is stored depends on whether the desktop applications 302 detect that an item associated with the inventory data has been purchased.

In an example embodiment, the desktop data may include a result of a query made with the desktop application 302 (e.g., a desktop item query). The query may be a search and the search results (e.g., item listings) a user has already retrieved from the server 330 via the search module 306 may be stored as desktop data within the client datastore 326. The network publication system 300 may consequently be relieved from storing personal data for its users on the system server 330 and/or the server datastore 334.

The method 500 continues at block 504 with accessing the desktop data. The desktop applications 302 may access the client datastore 326 via the client datastore interface 318. In an example embodiment, inventory data stored locally may be accessed based on metadata describing the inventory data.

As described in an example embodiment above, the desktop applications 302 may search for item listings stored within the client datastore 326 using the local search module 306. The results of the search may be accessible for certain operations (e.g., browsing, searching, buying, sorting, etc.) even when the user is not communicatively coupled with the networked system 102. because the data is available offline, the user can download a large set of items overnight, and later filter this list of data that's served locally (described below).

At block 506 an analysis may be performed on the desktop data. In an example embodiment, the desktop data analyzer 308 may perform various analyses on the desktop data. An example analysis may determine which of a list of item listings is associated with a greatest level of popularity on the desktop and/or throughout the network publication system's 100 community of users. An example measure of popularity may be a number of times a desktop user and/or community users have interacted with an item listing (e.g., the desktop data). Analyzing a desktop data for popularity may include the desktop data analyzer 308 identifying a most frequently made search and/or a most frequently purchased item.

The method continues at block 508 with providing a functionality of the desktop application 302 based on a result of the analysis. Data stored local to the client machine 301 (e.g., desktop data stored within the client machine 301 or the client datastore 326) may be available off-line and may be used by the recommendation module 310 to generate recommendations for items that may be of interest to a particular user. Because the desktop applications 302 may store search data locally and make the data available off-line, the user may enjoy the relative security of managing and holding their own data and not having to have that data stored on a third party site.

At block 510, the method 500 includes recommending a query. In an example embodiment, the most frequently made search or a most frequently purchased item may be the result of an analysis performed and delivered by the desktop data analyzer 308 to the recommendation module 310. The recommendation module 310 may in turn recommend a specific search or an item to purchase based on that information.

The recommendation module 310 may further base recommendations for searches or purchase items on the network system users' popular search terms and/or purchases. In an example embodiment, the client machine 301 may receive publication system data (e.g., results of a query made by a user of the network publication system 102) via the communication module 316. The publication system data may be associated with an item query (e.g., a publication system item query) made via the network publication system 300.

Providing a recommendation may include the desktop applications 302 merging desktop data (e.g., a user's favorite query results such as search terms, browse paths, etc.) with the publication system data. The recommendation may be helpful to a user of the client machine 301 because a user who has made a particular query in the past may be likely to make the same query in the future. A query that system users frequently make compared to other queries may be more likely to be of interest to any single user of the networked system 102. In an example embodiment, the desktop data analyzer 308 may select a portion of the merged data based on the popularity of the desktop data and the publication system data. The recommendation module 310 may recommend the portion of the merged data (e.g., a list of recommended item queries) based, at least in part, on the selection.

At block 512, the method includes generating a personalized advertisement. As described above, the desktop data analyzer 308 may determine a most frequently made search and/or a most frequently purchased item through its analysis. In some example embodiments, the marketing module 316 may combine the results of the analysis (e.g., the most frequently made search or purchased item) with a specified theme (e.g., a theme used to market a product such as a bright color) to generate the personalized advertisement based on the combination. Some example themes are provided to the marketing module 312 by the server 330 via the network 328.

An example local search module 306 may provide functionality based on the analyses of the desktop data analyzer 308 by performing an automatic search based on the most frequently made search and/or the most frequently purchased item.

The desktop data analyzer 308 may provide the most frequently made search and/or the most frequently purchased item to the alert module 314. In a network publication system 100, the alert module 314 may monitor the network for events (e.g., bids) associated with publications. In an example embodiment, the alert module 314 may generate an alert when an event associated with the most frequently made search or purchased item is detected. Example events may include a lowered item price, a bid for an item that is the subject of the most frequently made search or purchased item, or any other system event, etc.

Further example embodiments may include the desktop data analyzer 308 analyzing the desktop data to identify a statistical anomaly in the desktop data. An example analysis may identify a relatively low price for a list of similar items for sale. The recommendation module 310 may then recommend that a user purchase the item because of its relatively low price.

Filters provide a means for the user to reduce the output of search results to those items of interest to the particular user. In an example embodiment, the filtering module 304 may create a filter to narrow a first result of a desktop item query and later apply the filter to the results of an item query that is made after the first desktop item query. In some example embodiments, once an item of interest is found, the desktop applications 302 may initiate a sale of the item based on detecting a drag and drop operation (e.g., dragging the item of interest from listing area of a user interface to a buying area of a user interface, not shown).

Alternatively or additionally, a user may have previously viewed some items that matched filter criteria. Information related to these items may be stored as desktop data in the client datastore 326. Later, the user can access the information related to these items from the client datastore 326. Also based on the desktop data, the user may be able to determine who the seller was for a particular item and then determine whether that seller is selling any more of those items. Alternatively or additionally, the user can use titles and/or classification, etc., of the items of interest to generate a new search.

Figure 6:
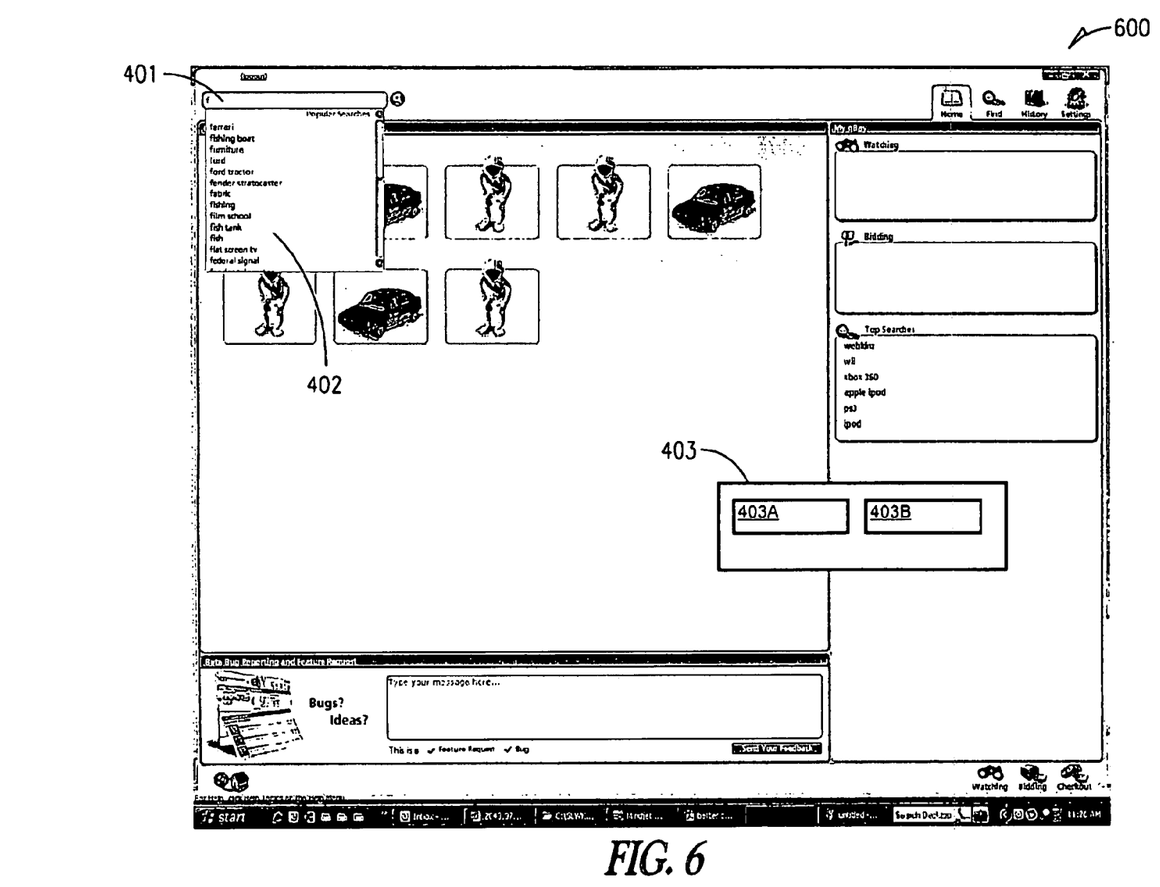
FIGS. 6, 7 and 8 are block diagrams of screenshots showing example desktop applications interfaces.

FIG. 6 is a block diagram of a screenshot showing an example desktop applications interface 600. In FIG. 6, when a user types a letter into a search field 601, the desktop applications interface 600 returns a list of recommendations 602 (e.g., as determined above) suggesting words the user might be intending to enter for a search. As the user types in additional letters, the recommendation module 310 may reference the user's favorite search words and the search words popular with the network publication system's 300 users. The recommendation module 310 may eliminate some of the search terms as they may not contain letters typed in same order as typed into the search field 701 of the desktop applications interface 700 in FIG. 7 (e.g., compare search fields 601 and 701 as letters are typed). Some or all of the remaining search terms may be available for recommendations.

Figure 7:
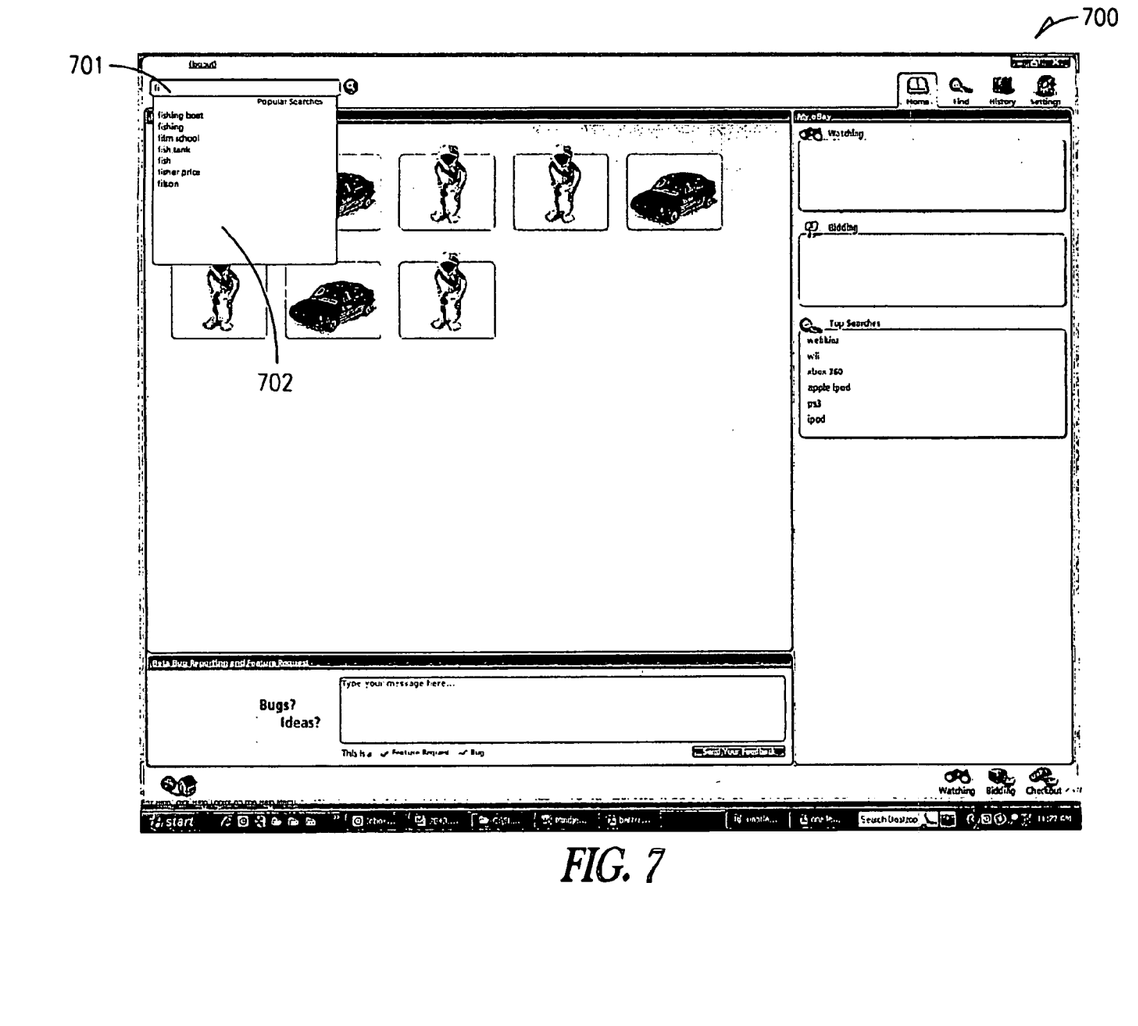

The recommendation module 310 may be configured to assign different weights to the user's favorite queries and/or the network publication system's 300 users' popular queries. The weights assigned may affect the output of a recommendation algorithm and/or computation that determines the recommendation. As shown in FIGS. 6 and 7, the desktop applications interfaces 600, 700 may provide search term recommendations in a drop down menu 702 according to the results of the recommendation algorithm and/or computation.

Figure 8:
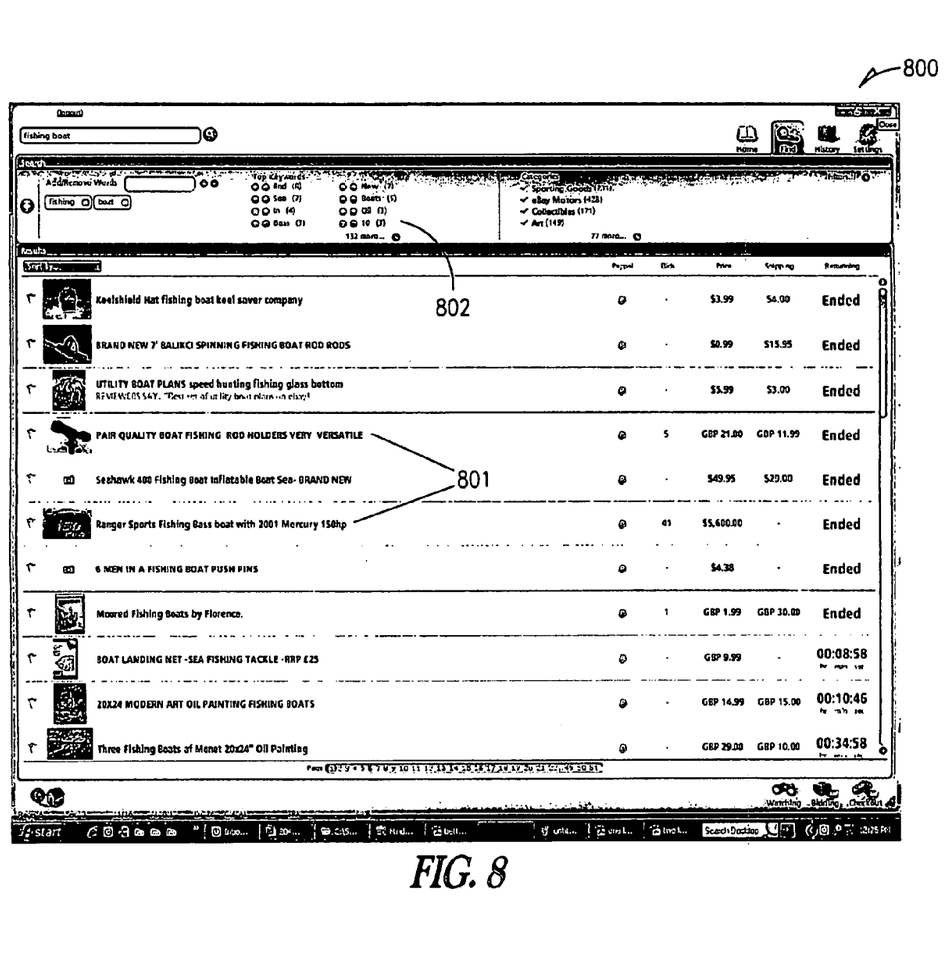

FIG. 8 is a screenshot showing the desktop applications interface 800 displaying results 801 of a search for "fishing boat". In an example embodiment, the desktop data may be processed locally to, for example, customize user functionality such as the user filters. In an example embodiment, the filtering module 304 of the desktop applications 302 may compute filter words 802 used to filter the results, based on the frequency that the words appear in the results. The filtering module 304 may filter the results with local filter words and/or with global filters (e.g., community based filters defined independent of the search results).

Example embodiments may also include forwarding certain user data to the networked system 102 for processing and/or analysis (e.g., marketing information, user behavior, etc.). In example embodiment, certain data are not collected by the network system 102 without the user's permission.

Figure 9:
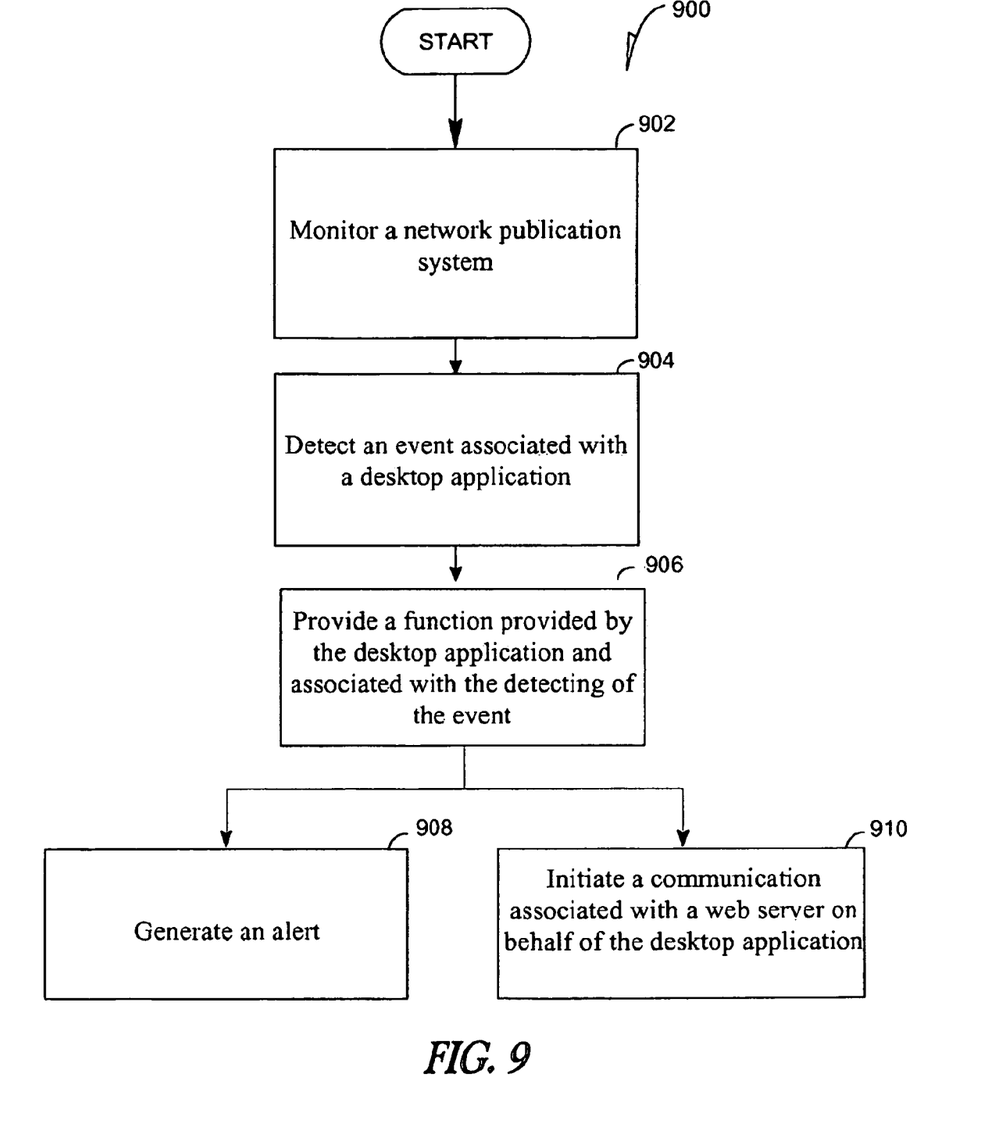
FIG. 9 is a flow diagram of a method for providing a function of a desktop application, in accordance with an example embodiment.

FIG. 9 is a flow diagram of a method 900 for providing a function of a desktop application, in accordance with an example embodiment. At block 902, the method 900 begins with monitoring a network publication system and at block 904 includes detecting an event associated with a desktop application.

In an example embodiment, the complementary application 320 runs on the client machine 301 along with the desktop applications 301. The complementary application 320 may share resources with and work in cooperation with the desktop applications 301. In general, the complementary application 320 compliments the operation of the desktop applications 302. In an example embodiment, the complementary application 320 may automatically monitor the network publication system 300 for events occurring locally or within the network system 300. In an example embodiment, the events are user defined and may be associated with the operation and/or the functionality of the desktop applications 302. An example event may include a bid on an item being sold. It is to be appreciated that the complementary application 320 may monitor the system 300 for any event that may be of interest to a user, the desktop applications 302 or to the system itself.

At block 906, the method 900 includes providing a function provided by the desktop application and associated with the detecting of the event. As described above, the desktop applications 302 include the alert module 314 to alert a user to an event. In some example embodiments, the complementary application 320 may provide an alternative to relying on the alert module 314 to provide all the alerts.

At block 908, the method includes generating an alert. The complementary application 320 may provide an alert (e.g., a sound, or visual stimuli) to a user of the client machine 301 upon the happening of an event (e.g., the user has been outbid) that occurs within the network publication system 300. In an example embodiment, whenever an event happens of interest to a particular user, the complementary application 320 automatically sends an alert to the user.

FIG. 6 includes a block diagram illustrating an example size of the complementary application interface 603 compared to an example size of the desktop applications interface 600. The complementary application interface 603 may include a data entry portion 605 to enter data and a display portion 607 to displays data.

In an example embodiment, an event alert message generated by the complementary application 320 may advise the user that the user can now bid on an item. A user may enter data (e.g., a bid offer on a listing item) into the data entry portion 605 of the complementary application interface 603. In example embodiments, the event alert message may be displayed to the user as a visual indicator via a relatively small user interface (e.g., small compared to the desktop applications interface 600 and/or the display screen (not shown)). It is to be appreciated that the user interacts with the complementary application's user interface to receive and respond to the alert instead of having to operate the desktop applications 302. As such, the user does not need to minimize any other programs or lose the context of the work he or she was doing prior to the detection of the alert.

At block 910, the method 900 may conclude with initiating a communication (e.g., associated with a function provided by the desktop applications 302) with a web server on behalf of the desktop application 301. The communication may be associated with the function provided by the desktop applications 302.

Various examples of the complementary application 320 may receive data from and cause transmission of data to the desktop applications 302 and the server 330. In an example embodiment, data that is received by the complementary application 320 from the server 330 or transmitted from the complementary application to the server 330 may pass through the desktop applications 302. Alternatively or additionally, when communicating with the server 330 some data may be received by or transmitted from the complementary application 320 without passing through the desktop applications 302 (e.g., communication directly with the server 330 via the server interface 322).

The data may include a message that causes a desired effect in the server 330 (e.g., send in bid for an item). In an example embodiment, in response to an alert indicating that the user has been outbid, the user can enter a bid into the data entry portion 605 that is greater than the current bid. In an example embodiment, the complementary application 320 and the desktop applications 302 may communicate in the background (e.g., simultaneous to their other tasks without displaying any evidence of their communication), through the processing of instructions or other means, etc., in order update records and or synchronize data, etc.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
   causing desktop data associated with a desktop application and associated with a network publication system to be stored in a storage;
   accessing the desktop data;
   receiving publication system data associated with an item query made via the network publication system;
   merging the desktop data with the publication system data to create merged data;
   performing an analysis on the merged data, the analysis including selecting a portion of the merged data based on a first popularity of the desktop data and a second popularity of the publication system data; and
   providing a function based on a result of the analysis, the providing of the function including making a recommendation based on the portion of the merged data.

2. The method of claim 1, wherein the desktop data is further associated with a desktop item query made via the desktop application.

3. The method of claim 2, wherein the desktop data includes a first result of a first desktop item query, the performing of the analysis includes creating a filter to narrow the first result, and the providing of the function includes applying the filter to a second result of a second desktop item query.

4. The method of claim 1, wherein the desktop data is further associated with at least one of an item purchased via the desktop application, account information, rating information or metadata.

5. The method of claim 1, wherein the desktop data is stored local to the client machine.

6. The method of claim 1, wherein the desktop data includes inventory data for an item and metadata, wherein the metadata is associated with the inventory data.

7. The method of claim 6, wherein the accessing of the desktop data includes accessing the inventory data based on the metadata.

8. The method of claim 6, further comprising:
   initiating a sale of the item based on detecting a drag and drop operation.

9. The method of claim 6, wherein the causing of the inventory data to be stored includes detecting whether the item has been purchased and storing the inventory data based on whether the item has been purchased.

10. The method of claim 1, wherein the performing of the analysis includes identifying at least one of a most frequently made search and a most frequently purchased item.

11. The method of claim 10, wherein the function includes recommending a specific search.

12. The method of claim 10, wherein the function includes performing an automatic search based on at least one of the most frequently made search and the most frequently purchased item.

13. The method of claim 10, wherein the function includes recommending an item to purchase.

14. The method of claim 10, wherein the function includes combining at least one of the most frequently made search and the most frequently purchased item with a specified theme and generating a personalized advertisement based on the combination.

15. The method of claim 14, further comprising:
   receiving the specified theme from the network publication system.

16. The method of claim 1, wherein the function includes generating an alert.

17. The method of claim 1, wherein the function includes identifying a statistical anomaly in the desktop data.

18. The method of claim 17, wherein the identifying of the statistical anomaly includes identifying a relatively low price for an item.

19. A system comprising:
- a client machine including desktop applications;
- a datastore coupled to the client machine to store desktop data, the desktop applications including a datastore interface coupled to the datastore to communicate the desktop data with the datastore;
- a communication module to receive publication system data associated with an item query, to merge the publication system data with the desktop data, and to communicate the merged data to the datastore;
- a desktop data analyzer to access the merged data from the datastore and to perform an analysis on the merged data, the desktop data analyzer further to select a portion of the merged data based on a first popularity of the desktop data and a second popularity of the publication system data; and
- a recommendation module to make a recommendation based on the selection of the portion of the merged data.

20. The system of claim 19, wherein the desktop data analyzer is to perform an analysis of the desktop data to identify at least one of a most frequently made search and a most frequently purchased item, and the desktop applications include a search module to perform an automatic search based on the analysis.

21. The system of claim 19, wherein the desktop applications include a marketing module to combine a result of the analysis with a specified theme and to generate a personalized advertisement based on a combination of the result and the specified theme.

* * * * *